United States Patent [19]
Youngs et al.

[11] Patent Number: 5,781,616
[45] Date of Patent: Jul. 14, 1998

[54] SYSTEM AND ASSOCIATED METHOD FOR HISTORICAL DIALING

[76] Inventors: Edward A. Youngs, 4791 Franklin Dr., Boulder, Colo. 80301; Monica A. Marics, 916 12th St., Boulder, Colo. 80302

[21] Appl. No.: 681,024

[22] Filed: Jul. 22, 1996

[51] Int. Cl.$^6$ .................................................. H04M 1/64
[52] U.S. Cl. .............................. 379/89; 379/213; 379/211
[58] Field of Search ................... 379/67, 88, 89, 379/210, 211, 212, 213

[56] References Cited

U.S. PATENT DOCUMENTS

| | | | |
|---|---|---|---|
| 5,247,571 | 9/1993 | Kay et al. | 379/207 |
| 5,572,579 | 11/1996 | Orriss et al. | 379/211 |
| 5,598,464 | 1/1997 | Hess et al. | 379/213 |
| 5,602,909 | 2/1997 | Carkner et al. | 379/211 |

*Primary Examiner*—Fan S. Tsang
*Attorney, Agent, or Firm*—Sheridan Ross & McIntosh

[57] ABSTRACT

A system and method for facilitating communication between a calling party and a first person via a first termination telephone number formerly associated with the first person is disclosed. In one embodiment, the method of the present invention includes the steps of receiving an incoming call from a calling party, the incoming call initiated via at least a service code, and receiving a first input from the calling party, the first input corresponding to the first termination telephone number formerly associated with the first person, processing the first input to retrieve a second termination telephone number presently associated with the first person, and routing the incoming call to the first person via the second termination telephone number.

38 Claims, 4 Drawing Sheets

SYSTEM AND ASSOCIATED METHOD FOR HISTORICAL DIALING

FIELD OF THE INVENTION

The present invention generally relates to a system and process for facilitating communication between a calling party and a first person and, in particular, a system and associated method for facilitating communication between a calling party and a first person via a termination telephone number formerly associated with the first person.

BACKGROUND OF THE INVENTION

In order to communicate with a selected individual via a telephone, a party may attempt to communicate with the individual by placing a telephone call to a specific termination telephone number, which is generally associated with a specific location, such as the individual's home. However, communication may not be readily established in instances where the individual being called by the calling party has moved or the termination telephone number utilized by the calling party has changed.

One approach for facilitating communication between a calling party and such an individual concerns call forwarding. In this approach, the individual may have the local telephone service provider forward incoming calls from the individual's "old" number to the individual's "new" number. In this regard, a calling party may dial the individual's old termination telephone number and a call forwarding system would forward the incoming call to the individual via the individual's new termination telephone number. Such a system, however, can be burdensome for local telephone service providers as call forwarding requires such an individual to have assigned two different termination telephone numbers (e.g., old and new numbers). As such, the individual's old number cannot be reassigned to another party in spite of an increasing need for phone companies to quickly reassign such old phone numbers to other parties.

SUMMARY OF THE INVENTION

Accordingly, it is a primary object of the present invention to provide a system and associated method for facilitating communication between a calling party and a first person.

It is another object of the present invention to provide a system and associated method for facilitating communication between a calling party and a first person in instances where the first person has a new termination telephone number due to, for example, a change in location.

It is a further object of the present invention to provide a system and associated method for historical dialing, which facilitates communication between a calling party and a first person by allowing a calling party to utilize a first termination telephone number formerly associated with the first person to communicate with the first person.

The present invention achieves one or more of these objectives by providing a system and associated method for historical dialing. In one aspect, the system of the present invention facilitates communication between a calling party and a first person via the first termination telephone number formerly associated with or assigned to the first person by providing a receiver for receiving an incoming call initiated by the calling party via a service code and the first termination telephone number formerly assigned to the first person, a processor for processing at least the first termination telephone number to retrieve from a database information concerning communicating with the first person, and a device for performing at least one of routing the incoming call to one of a second termination telephone number associated with the first person and a voice mail number, or playing to the calling party an intercept message corresponding to the first person.

In one embodiment, the receiver is implemented in a central office switch capable of receiving and routing telephone calls in accordance with a termination telephone number. For purposes of receiving an incoming call from a calling party, the incoming call being initiated via at least a service code (e.g., *56), the receiver includes a trigger for acknowledging or recognizing the validity of the service code received via the incoming call and for activating a stored program control, which may thereafter generate a data specific query for information from the database associated with the processor, the query being based upon the first termination telephone number. In an alternative embodiment, the incoming call may be initiated via speech recognition or computer command.

For purposes of responding to such queries for information related to the first termination telephone number, the processor of the present invention is capable of receiving and processing the queries to retrieve from a database associated therewith information, if any, corresponding to the first person. As such, the processor may also be capable of generating an appropriate instruction based upon the information retrieved from the database. The information in the database corresponds to the first termination telephone number and may indicate a desire by the first person formerly associated therewith to have incoming calls initiated via the service code and first termination telephone number routed to either a second termination telephone number or a voice mail number, or, alternatively, to have an intercept message played to the calling party. In this regard, the database may contain a second termination telephone number, a voice mail number, and information or data indicative of a desire by the first person to have the incoming call routed to one of these numbers, or a message played to the calling party. In one embodiment, the processor includes a service control point interconnected to the database. In another embodiment, the database is associated with a peripheral to one of the switch and the service control point.

In order to route the incoming call to a second termination telephone number or a voice mail number, in accordance with the instruction, which corresponds to the information retrieved from the processor, the system may include a device for routing telephone calls. In one embodiment, routing of telephone calls is conducted by a central office switch interconnected to the processor. In a preferred embodiment, the switch includes the above-noted trigger and stored program control and is capable of routing telephone calls in accordance with instructions from the processor. In order to play an intercept message to the calling party, the system may also include a device for playing such intercept messages. In one embodiment, such a device for playing includes a centralized intercept system interconnected to the processor via a switch.

In another aspect, the present invention provides a method for facilitating communication between a calling party and a first person via a first termination telephone number formerly associated or assigned to the first person. The method may include the steps of receiving from the calling party an incoming call initiated at least by a service code, receiving a first input corresponding to the first termination telephone number, processing at least the first termination telephone number to retrieve or obtain information concerning communicating with the first person, and performing one of first, second and third steps based upon the information obtained during the processing step, the first step including the step of routing the incoming call to a second termination telephone number associated with the first person, the second step including the step of playing to the calling party an intercept message corresponding to the first person, and the third step including the step of routing the incoming call to a voice mail number to enable the calling party to leave a voice mail message for the first person. In this regard, in instances where a voice mail number and/or a second termination telephone number has been assigned to the first person for use to receive incoming calls after the first person's disassociation with the first termination telephone number, communication may be facilitated between a calling party and the first person if the first person elects to have such information subject to retrieval from a database by calling parties who seek such information via initiating an incoming call via the service code.

In one embodiment, the steps of receiving the service code and the first termination telephone number are performed substantially consecutively. As such, the method of the present invention contemplates receiving from the calling party an incoming call initiated via a service code and the first termination telephone number. The step of receiving the incoming call via at least the service code may also comprise acknowledging the validity of the service code to activate a stored program control which is capable of generating a query for the information concerning communicating with the first person. In this regard, in another embodiment, the step of processing at least the first termination telephone number to obtain such information comprises the step of generating a query for information concerning communicating with the first person, the query corresponding and including at least a reference to the first termination telephone number formerly associated with the first person.

In another embodiment of the method of the present invention, the step of processing at least the first termination telephone number includes the steps of searching for information corresponding to the first termination telephone number and generating an instruction corresponding to the information retrieved during the search. Processing the first termination telephone number to obtain information regarding communicating with the first person may also include the step of directing a switch to perform one of the first, second and third steps, in accordance with the instruction generated from the information retrieved from a database containing such information.

DETAILED DESCRIPTION

The system and associated method for historical dialing is generally used to facilitate communication between a calling party and a first person via a service code (e.g., prefix) and a first termination telephone number formerly associated with the first person by either routing an incoming call initiated via the service code and the first termination telephone number to a second termination telephone number associated with the first person, or to a voice mail number associated with the first person, or by playing an intercept message to the calling party to provide information concerning the first person. In this regard, the system and method of the present invention allow a person whose telephone number has changed to provide a means by which the person can communicate with calling parties who are not aware of the person's new telephone number. In addition, the system and method of the present invention allow local telephone service providers to quickly recycle (e.g., reassign) telephone numbers formerly associated with such persons.

Figure 1:
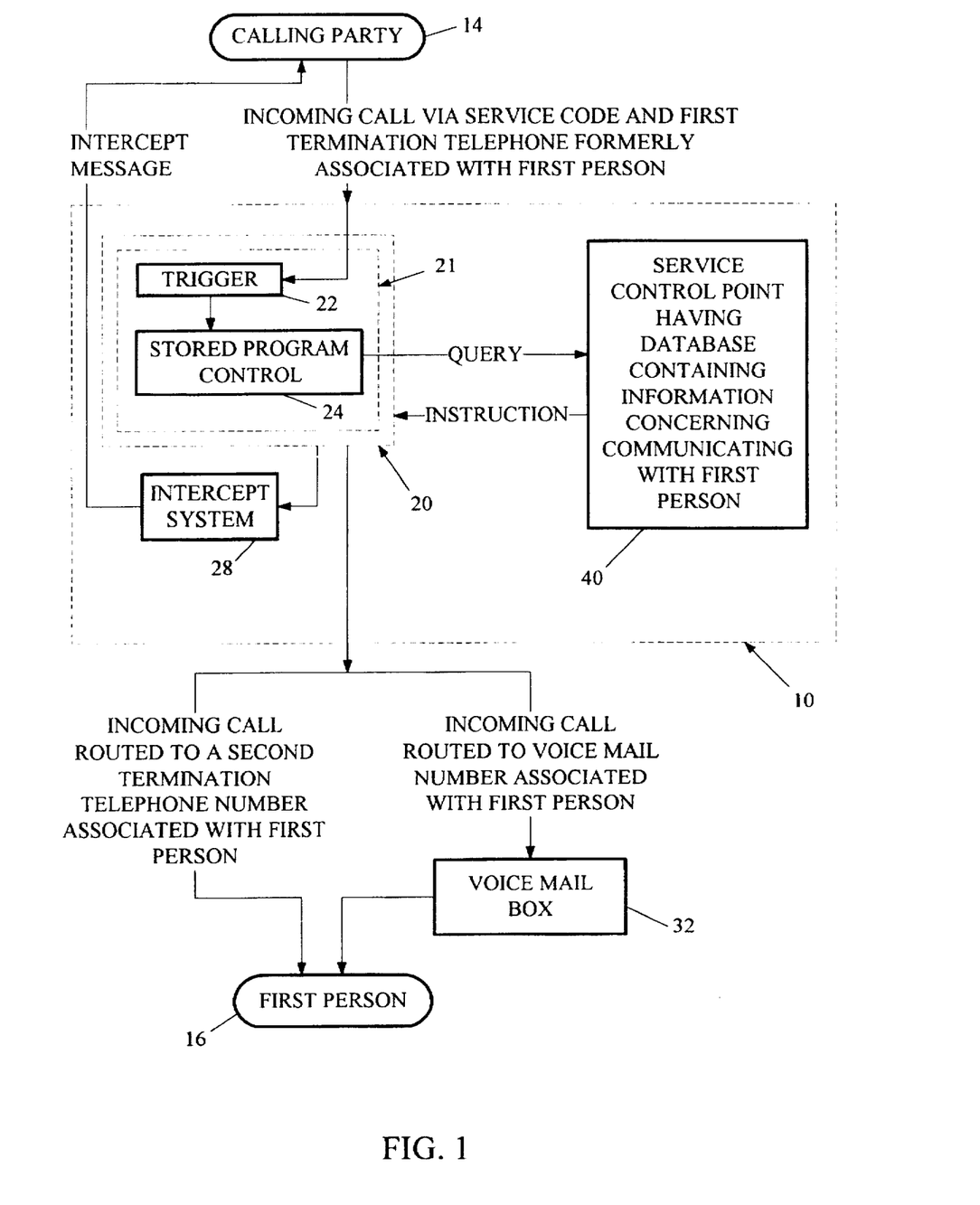
FIG. 1 is a diagrammatic illustration of one embodiment of the system for historical dialing according to the present invention.
Figure 2:
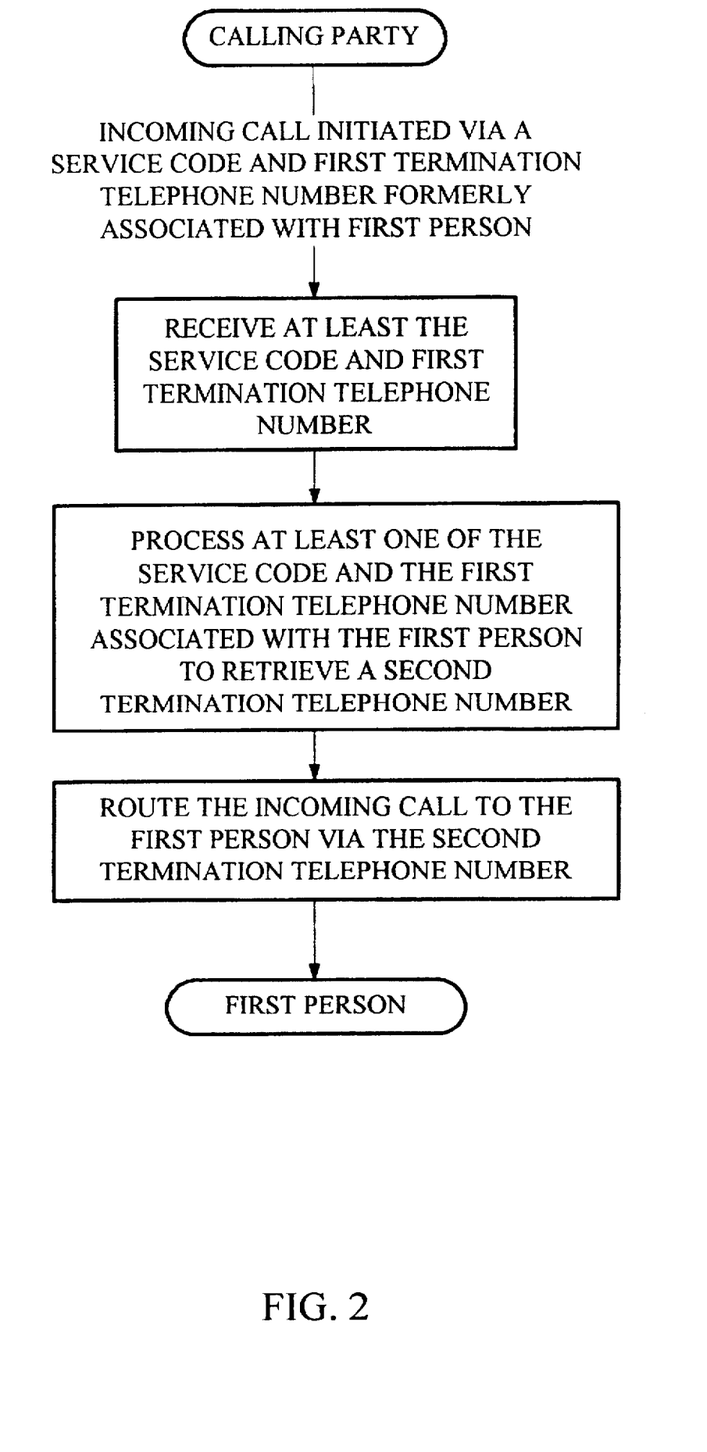
FIG. 2 is a flow chart of one embodiment of the method for historical dialing according to the present invention.
Figure 3:
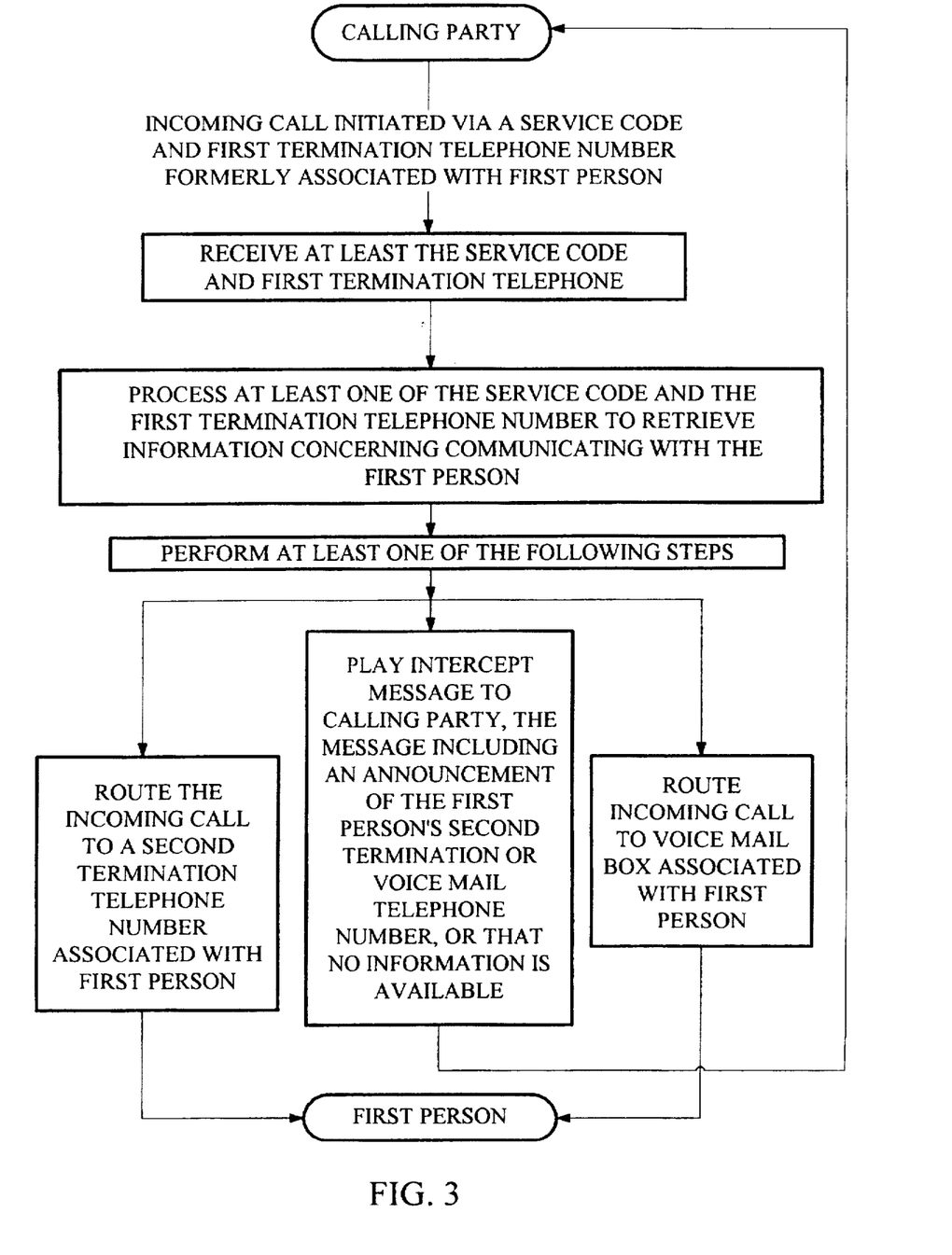
FIG. 3 is a flow chart of another embodiment of the method for historical dialing according to the present invention.

FIGS. 1-3 illustrate a system and methods for historical dialing which embody various features of the present invention. In one embodiment of a system for providing a historical dialing service which facilitates communication between a calling party 14 and a first person 16, illustrated in FIG. 1, the system 10 includes a switch 20 for receiving an incoming call initiated by the calling party 14 via a service code (e.g., *56) and a first termination telephone number formerly associated with the first person 16 and a service control point 40 for processing at least the first termination telephone number to retrieve information regarding communicating with the first person 16. The service control point 40 then utilizes such information to instruct the switch 20 to either play an intercept message to the calling party 14 or to route the incoming call to a second termination telephone number associated with the first person 16 or to a voice mail number for the first person 16. As such, the system 10 is particularly useful in facilitating communication between the calling party 14 and the first person 16 in instances where the first person 16 is no longer associated with the first termination telephone number known by the calling party 14. In this regard, if a calling party 14 is unsuccessful in contacting the first person 16 via the first termination telephone number because the first termination telephone number formerly associated with the first person 16 has been recycled to a second person, the calling party 14 may simply invoke the historical dialing service of the present invention by initiating an incoming call via a specific service code and the first termination telephone number formerly assigned to the first person 16 to attempt to communicate with the first person 16. Further, in view of the increasing need to quickly reassign telephone numbers formerly associated with such persons, the system 10 allows such termination telephone numbers to be recycled to a second person without having to "hold" first and second termination telephone numbers for the first person and without substantial disruption in the ability for calling parties to communicate with the first and second persons.

In one embodiment of the invention, for purposes of receiving and processing such an incoming call initiated via at least a service code from the calling party 14, the switch 20 includes a receiver 21, illustrated in FIG. 1. Generally, in order to process incoming calls initiated via a service code dialed in (e.g., via dual tone multiple frequency ("DTMF") inputs) by a calling party 14, the switch 20 must receive a legitimate or acceptable service code, which are typically different, depending upon the service being offered under the specific service code. In this regard, as the incoming call for this service can be initiated by the calling party 14 via a selected service code (e.g., *56) and the first termination telephone number formerly associated with the first person 16, the receiver 21 of the switch 20 is capable of receiving and recognizing or acknowledging the validity of at least the service code for the historical dialing service. In this regard, the receiver 21, upon receipt of the service code via the incoming call, can initiate or invoke a search for information regarding communicating with the first person 16, who is no longer assigned the first termination telephone number. In one embodiment of the system 10, illustrated in FIG. 1, the receiver 21 includes a Public Office Dialing Plan Feature Access Code Trigger 22 for acknowledging the validity of the service code. Such a Public Office Dialing Plan Feature Access Code Trigger 22 is commercially available in switches from Lucent, and Nortel, and may be implemented in the switch 20. In alternative embodiments, where the service code is initiated via voice or computer command, the service code is recognized by a speech recognition system or a computer associated with the switch.

As illustrated in FIG. 1, the receiver 21 of the switch 20 also includes a stored program control 24, associated with the trigger 22, for processing the service code and/or the first termination telephone number formerly associated with the first person 16. More specifically, upon acknowledgement of the validity of the service code by the trigger 22 and receipt of the service code and/or the first termination number formerly associated with the first person 16 by the stored program control 24, the stored program control 24 processes the service code and the first termination telephone number to generate a data specific query (e.g., second_termination_ telephone_number (first_termination_telephone_ number)) for information concerning communicating with the first person 16. In this regard, the stored program control 24 utilizes the specific service code for this service and the first termination telephone number to request from the service control point 40 (which will be discussed in more detail hereinbelow) information, if any, concerning communicating with the first person 16. In one embodiment, the stored program control 24 is implemented in the switch 20. Such a stored program control 24 is commercially available from Lucent, Nortel and Ericsson.

In instances where the calling party 14 placed a call to the first person 16 via the first termination telephone number and found that the first person 16 was no longer associated with the number, the system 10 also allows the calling party 14 to simply initiate an incoming call via the service code (e.g., *56) to be routed to the first person 16 or to obtain information concerning communicating with the first person 16. In this embodiment, where only the service code is received from the calling party 14 subsequent to the call placed by the calling party 14 to the first person 16, the switch 20, and specifically, the stored program control 24 may be programmed to retrieve from a register the termination telephone number containing the most recently originated call from the calling party 14 (i.e., the first termination telephone number formerly associated with the first person). In one embodiment, upon receipt of the service code by the switch 20, the stored program control 24 is programmed to look for a termination telephone number for a number of seconds (e.g., four seconds). If no such termination telephone number is received from the calling party 14, the stored program control 24 will then use the termination telephone number from the most recently originated call from the calling party 14 to generate a data specific query for information.

For purposes of processing and responding to queries for information from the switch 20, and specifically, the stored program control 24 of the receiver 21, in one embodiment, illustrated in FIG. 1, the system 10 also includes a network element processor, namely, a service control point 40 having a database (not shown) containing information concerning communicating with such a first person 16. In this regard, the service control point 40 contains the service logic for processing the query from the switch 20 to retrieve (e.g., data dip) information, if any, concerning communicating with the first person 16, based at least upon the first termination telephone number formerly associated with the first person 16. In one embodiment, for purposes of ensuring confidentiality of the information, the database is a secured network element in the service control point 40. In another embodiment (not shown), the database is contained within a peripheral interconnected to one of the switch 20 and the service control point 40. The service control point 40 having the service logic capable of retrieving such information from a database is a commercially available system (e.g., Digital Equipment, Hewlett-Packard).

The information contained within the database of the service control point 40 generally concerns communicating with the first person 16 by a means other than the first termination telephone number, which may be recycled to a second person. In one embodiment, the first person 16 governs what information is retrievable from the database for use by calling parties who seek such information via the service code and the first termination telephone number formerly assigned to the first person 16. As noted hereinabove, the system 10, in one embodiment, is capable of performing at least one of playing an intercept message to the calling party 14 and routing, via the switch 20, the incoming call to a second termination telephone number assigned to the first person 16 or to a voice mail number associated with a voice mail box 32 accessible by the first person 16. In this regard, the retrievable information in the service control point 40 database may include, at the discretion of the first person 16, the second termination telephone number of the first person 16. As such, in response to the query from the stored program control 24, the service control point 40 may retrieve the second termination telephone number associated with the first person 16. Alternatively, in instances, for example, where the first person 16 does not want calling parties who do not know the first person's 16 second termination telephone number to communicate with the first person 16 directly via the second termination telephone number of the first person 16, the service control point 40 database may instead include a voice mail number associated with a voice mail box 32 accessible by the first person 16. In this regard, in response to the query from the stored program control 24, the service control point 40 would retrieve from the database a voice mail number for the first person 16. The first person 16 may alternatively elect to have provided to such calling parties an intercept message. In this regard, the information retrieved from the service control point 40 database may comprise information to be included in a message to be played to the calling party 14. In one embodiment, the information retrievable from the database includes the second termination telephone number of the first person 16. In instances where the first person 16 has elected to provide no information for calling parties who invoke the historical dialing service via the service code and first termination telephone number formerly assigned to the first person 16, the service control point 40 may not retrieve any information from the database in response to the query from the stored program control 24.

In addition to retrieving information concerning communicating with the first person 16, the service control point 40 also includes the service logic for generating and forwarding instructions to the switch 20, the instructions corresponding to the information, if any, retrieved in the database of the service control point 40. For example, where the information retrieved from the database associated with the service control point 40 includes the second termination telephone number of the first person 16 and data or information indicative of a desire by the first person 16 to have incoming calls initiated via the service code routed to a calling party 14, the service control point 40 generates an appropriate instruction (e.g., call_fwd (second_termination_telephone_number)) to direct the switch 20 to route the incoming call to the first person 16 via the second termination telephone number. In instances where the information retrieved from the database in response to the query from the stored program control 24 includes the second termination telephone number and information indicating a desire to have a message containing the second termination telephone number played to a calling party 14, the service control point 40 generates an instruction (e.g., play_prompt_ (second_termination_telephone_number)) to direct a centralized intercept system 28 associated with the switch 20 to play an intercept message to the calling party 14, the message including the second termination telephone number of the first person 16. The service control point 40 may also retrieve a voice mail number associated with a voice mail box 32 accessible by the first person 16. In such cases, the service control point 40 generates an instruction (e.g., call_fwd (voice_mail_number)) to direct the switch 20 to route the incoming call initiated via the service code and the first termination telephone number to the voice mail box 32 to enable the calling party 14 to leave a message playable to the first person 16. A first person 16 may utilize this option in instances where new phone service to the first person 16 has not yet been established or where the first person 16 does not want the second termination telephone number released to any and all calling parties who initiate an incoming call via the service code and the first termination telephone number. In another embodiment, the service control point 40 retrieves no information from the database as the first person does not wish to provide any information to calling parties who invoke this service by placing an incoming call via the service code and the first termination telephone number formerly assigned to the first person. In such instances, the service control point 40 may generate an instruction (e.g., play_prompt (second_termination_telephone_number_not_available)) to direct the intercept system 28 to play an intercept message indicating to the calling party 14 that no information concerning communicating with the first person 16 is available. As such, the service control point 40 is capable of receiving and processing queries from the switch 20 to retrieve from a database associated therewith information regarding communicating with the first person 16, and generating and sending to the switch 20 an instruction based on the information retrieved from the database. In one embodiment, the service control point 40 having service logic to accomplish such functions is commercially available from Bellcore, Lucent and Hewlett-Packard.

For purposes of routing the incoming call to the first person 16 via the second termination telephone number or the voice mail number, the switch 20 is capable of following the instructions provided to the switch 20 by the service control point 40. In this regard, the switch 20 is capable of receiving and carrying out instructions generated and sent by the service control point 40, the instructions corresponding to the first person's 16 information in the service control point 40 database. Such a switch 20 capable of routing calls in accordance with instructions from a service control point 40 is a conventional system commercially available from Bellcore, Lucent and Hewlett-Packard.

As noted hereinabove, the first person 16 formerly associated with the first termination telephone number may wish to have a message played to calling parties. In one embodiment, the message playable to the calling party 14 includes information to inform the calling party 14 of the first person's second (e.g., new) termination telephone number. In another embodiment, the message playable to the calling party 14 includes information to inform the calling party 14 that the first termination telephone number is disconnected or is no longer is service. For purposes of providing such intercept messages to the calling party 14, the system 10, illustrated in FIG. 1, includes a centralized intercept system 28 which is capable of receiving instructions from the service control point 40 via the switch 20 associated therewith and playing intercept messages to the calling party 14 in accordance with the instructions. Such a centralized intercept system 28 is a conventional system and is commercially available from Lucent.

In another aspect of the present invention, a method for conducting historical dialing is disclosed. As such, the present invention provides a method for facilitating communication between a calling party and a first person via a first termination telephone number formerly assigned to or associated with the first person. In this regard, the method of the present invention allows a calling party to either be routed to the first person via a new (e.g., second) termination telephone number or voice mail number assigned to the first person or to receive information regarding communicating with the first person via an intercept message. As illustrated in FIGS. 2–3, the method includes the steps of receiving an incoming call initiated by a calling party via a service code, receiving a first input, specifically, the first termination telephone number formerly assigned to the first person and processing the service code and the first termination telephone number to retrieve or obtain information relevant to communicating with the first person, such as a second termination telephone number.

Generally, the method of the present invention provides calling parties an opportunity to communicate with the first person via the first termination telephone number even after the first person has been disassociated from the first termination telephone number and has been assigned a second termination telephone number different than the first termination telephone number. In order to provide such a service, the method of the present invention contemplates receiving an incoming call initiated by the calling party via a series of dual tone multiple frequency inputs from a touch tone telephone, the inputs corresponding to at least the service code (e.g., *56). For purposes of gathering information from the calling party regarding the first person, the method also contemplates receiving a first input from the calling party corresponding to the first person, such as the first termination telephone number formerly associated with the first person. In one embodiment, receiving the service code and the first termination telephone number formerly assigned to the first person are performed substantially consecutively. In this regard, the method contemplates receiving the service code and the first termination telephone number one after the other such that a calling party may invoke the historical dialing service simply by initiating an incoming call for this service by dialing or voice dialing a plurality of dual tone multiple frequency tones corresponding to the service code and the first termination telephone number. In this regard, the step of receiving includes the step of decoding a plurality of dual tone multiple frequency inputs in order to facilitate processing of the incoming call by the calling party. In one embodiment, the step of receiving the service code and the first termination telephone number is performed by a switch.

In an alternative embodiment especially useful in instances where the calling party does not possess the capability to initiate an incoming call via a series of dual tone multiple frequency inputs, the method includes the step of receiving, in addition to the service code, a series of voice inputs indicative of the first termination telephone number formerly associate with the first person. In this regard, receiving the service code and first termination telephone number may include the step of recognizing a plurality of voice inputs indicative of the first termination telephone number.

In yet another alternative embodiment, the method of the present invention contemplates receiving an incoming call initiated by the calling party via a service code (e.g., *56 from a dual tone multiple frequency telephone, or equivalently, 1156 from a rotary telephone). For purposes of obtaining information regarding the first person, the method also contemplates retrieving from a register in a switch receiving the incoming call, a record of the calling party's previous call which corresponds to the unsuccessful telephone call placed to the first person via the first termination telephone number formerly associated with the first person or, alternatively, the termination telephone number to which the calling party placed a call prior to initiating the incoming call via the service code (e.g., termination telephone number from the most recently originated call from the calling party). In this regard, receiving the first termination telephone number may include the step retrieving the first person's first termination telephone number from a register or memory in the switch.

Figure 4:
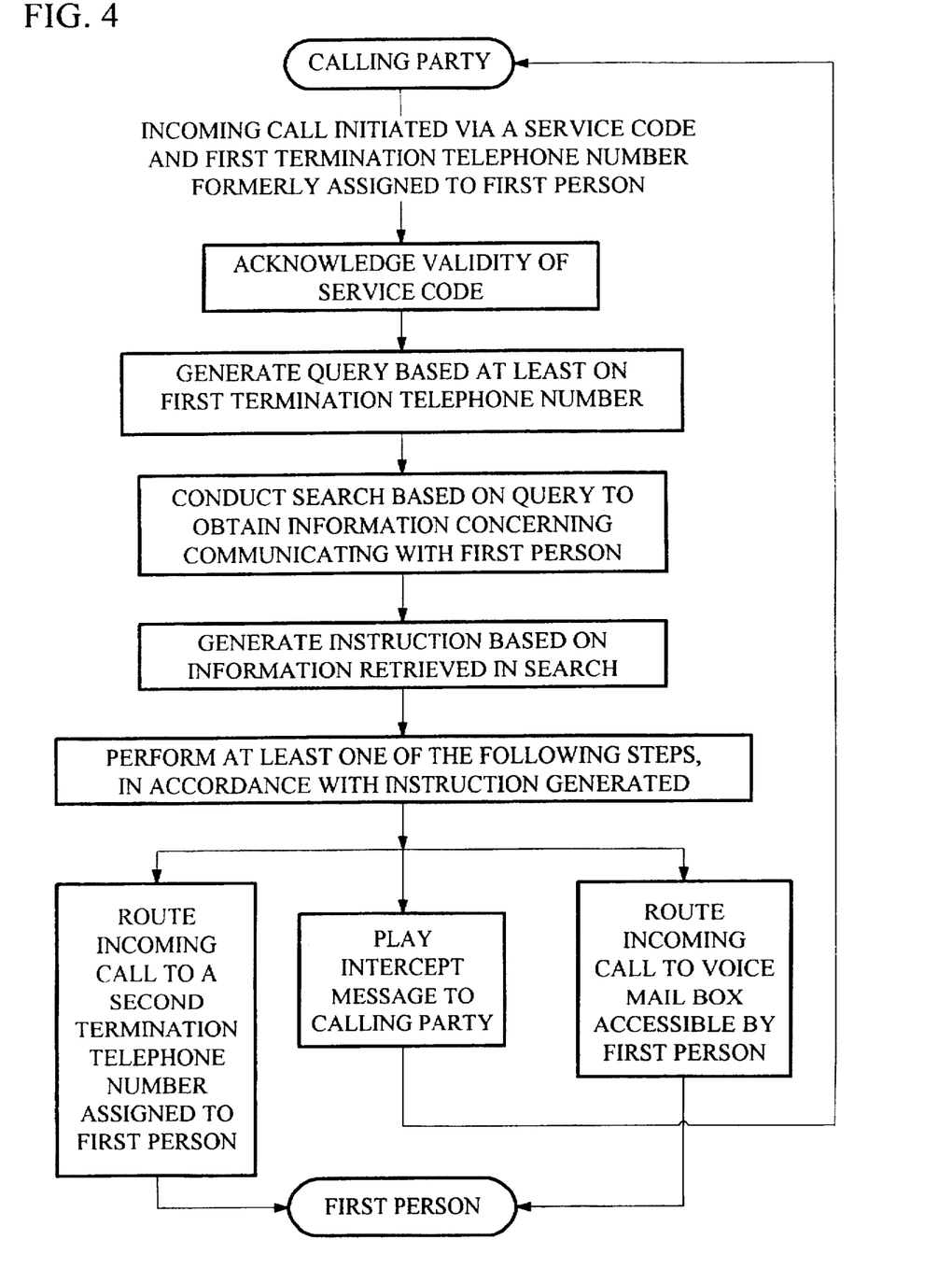
FIG. 4 is a flow chart of yet another embodiment of the method for historical dialing according to the present invention.

In another embodiment, illustrated in FIG. 4, the step of receiving the incoming call via at least the service code includes the step of acknowledging or recognizing the validity of the service code for the historical dialing service. In instances where a service code is received by the switch via an incoming call from a calling party, the switch, and specifically, a trigger (described hereinabove) examines the service code in order to determine whether the service code is valid. Upon validation of the service code, the information, and specifically, the service code and first termination telephone number are forwarded to a stored program control (described hereinabove) for processing, and, in particular, for generation of a data specific query.

Once the service code and the first termination telephone number formerly assigned to the first person have been received, the method of the present invention contemplates processing at least the first termination telephone number to attempt to obtain information concerning communicating with the first person, as illustrated in FIGS. 2-3. In one embodiment, the step of processing the first termination telephone number to obtain information includes the step of retrieving information (e.g., second termination telephone number) from a database by matching (e.g., data dipping) the first termination telephone number with information in the database. In another embodiment, illustrated in FIG. 4, the step of processing at least the first termination telephone number includes the steps of generating a data specific query to attempt to retrieve information concerning the first person, the query based upon the first termination telephone number, and searching for information, if any, stored in a database, the search based upon the subject matter contained in the query (e.g., data dipping). In this regard, the step of processing at least one of the service code and the first termination telephone number involves attempting to retrieve from a database information concerning communicating with the first person via a query corresponding to the first termination telephone number. A stored program control implemented in a switch may be used to generate a query while a service control point having a database containing information, such as second termination telephone numbers, voice mail numbers or message information, may be used to conduct the step of searching for any such information in a database associated with the service control point.

In order to further facilitate communication between the calling party and the first person, the step of processing at least one of the service code and first termination telephone number may further include the step of generating an instruction based upon the information, if any, retrieved in response to the query. In one embodiment, illustrated in FIG. 4, where the information stored in the database includes the second termination telephone number of the first person and data corresponding to a desire by the first person to have incoming calls initiated by the service code and first termination telephone number routed to the second termination telephone number, an instruction to route the incoming call to the second termination telephone number is generated by a service control point and sent to a switch which is capable of receiving and carrying out such an instruction. In another embodiment, where the information retrieved in response to the query includes a voice mail number and data indicative of a desire by the first person to have incoming calls initiated via the service code and first termination telephone number routed to a voice mail box accessible by the first person, the instruction to route the incoming call to the voice mail number is generated by a service control point and sent to a switch which is capable of receiving and carrying out such an instruction. In yet another embodiment, where the information retrieved is a second termination telephone number and data indicative of a desire by the first person to have a message containing the second termination telephone number played to the calling party, the instruction to play the intercept message is generated by a service control point and sent to an intercept system capable of playing the message, via a switch. In another embodiment, no information is retrieved in response to the query as the first person has elected that no action be taken to assist or provide information to the calling party. In such instances, the step of processing includes generating an instruction to direct, via a switch, an intercept system to play a message to the calling party. In this embodiment, the message informs the calling party that no information is available or, alternatively, that the number is not in service.

As illustrated in FIGS. 2-4, in addition to the steps of receiving an incoming call initiated via a service code and the first termination telephone number formerly associated with the first person and processing at least the first termination telephone number to retrieve information concerning communicating with the first person, if any, the method of the present invention further contemplates performing at least one of the following steps, depending upon and corresponding to the information retrieved as a result of the query and the instruction generated and related thereto: routing the incoming call to at least one of a second termination telephone number associated with the first person, a voice mail number associated with a voice mail box accessible by the first person, playing an intercept message to the calling party, the message containing information concerning one the first person's (e.g., second, voice mail) termination telephone number or an announcement that no information is available or the number is no longer in service. For example, in instances where the first person elects to provide the second termination telephone number to calling parties who utilize the historical dialing service, the method of the present invention contemplates routing via a switch the incoming call to the second termination telephone number, as illustrated in FIGS. 2–4, or alternatively, playing, via an intercept system, an intercept message to the calling party, the message including an announcement of the second termination telephone number, as illustrated in FIGS. 3–4. In another instance, where the first person elects to provide a voice mail number to allow calling parties to leave a voice message for the first person, the method of the present invention contemplates routing, via a switch, the incoming call to the voice mail number, recording voice inputs from the calling party, and playing to the first person a recording of such voice inputs from calling parties. In other instances, where the first person elects to provide no information for such calling parties who initiate an incoming call via the service code and the first termination telephone number, the method of the present invention contemplates invoking, via a switch, an intercept system to play an announcement or message to the calling party, the message indicating that no information is available or that the first termination telephone number is not in service.

In some instances, a calling party having a first termination telephone number formerly assigned to a first person may discover that the first termination telephone number was not only subsequently assigned to a second person, but is now assigned to a third person. In this regard, a calling party may wish to invoke the system and associated method of the present invention to be connected to or otherwise attempt to obtain information regarding a person "twice removed" from the first termination telephone number (e.g., a prior prior assignee of the first termination telephone number). In one embodiment (not shown), the system of the present invention is capable of obtaining information, if any, from such a prior prior assignee of the first termination telephone number. In this regard, the calling party may initiate an incoming call by twice dialing in the service code and the first termination telephone number. Upon receipt of such an input, the switch, and specifically, a stored program control generates a query to request information on the prior prior assignee of the first termination telephone number stored in a database associated with a service control point. The service control point may thereafter process the query to attempt to retrieve such information from the database associated therewith, and generate an appropriate instruction.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extend permitted by the prior art.

What is claimed is:

1. A method for facilitating communication between an calling party and a first person via a first termination telephone number formerly associated with the first person, said method comprising the steps of:

receiving an incoming call from the calling party, wherein the incoming call is initiated by the calling party via at least a service code;

receiving a first input from the calling party, the first input corresponding to the first termination telephone number that is no longer assigned to the first person;

processing at least the first input from the calling party to retrieve a second termination currently associated with the first person; and routing the incoming call to the first person via the second termination telephone number.

2. A method, as claimed in claim 1, wherein said steps of receiving the incoming call and the first input from the calling party are performed substantially consecutively.

3. A method, as claimed in claim 2, wherein the incoming call is initiated by the calling party via the service code before said step of receiving the first input from the calling party.

4. A method, as claimed in claim 1, wherein a switch is utilized to perform said steps of receiving the incoming call and the first input, wherein said step of receiving the first input comprises the step of retrieving the first termination telephone number from a register in the switch.

5. A method, as claimed in claim 1, further comprising the step of assigning a second termination telephone number to the first person, different than the first termination telephone number.

6. A method, as claimed in claim 1, wherein the second termination telephone number is associated with the first person subsequent to the association between the first person and the first termination telephone number.

7. A method, as claimed in claim 1, wherein the first input includes a plurality of dual tone multiple frequency inputs corresponding to the first termination telephone number, wherein said step of receiving the first input comprises decoding the plurality of dual tone multiple frequency inputs from the calling party.

8. A method, as claimed in claim 1, wherein the first input includes a plurality of voice inputs by the calling party, the voice inputs corresponding to the first termination telephone number of the first person, wherein said step of receiving the first input comprises recognizing the plurality of voice inputs from the calling party.

9. A method, as claimed in claim 1, further comprising the step of storing the second termination telephone number in a database.

10. A method, as claimed in claim 1, wherein said processing step comprises retrieving the second termination telephone number from a database, wherein said step of retrieving comprises the step of matching the first termination telephone number with the second termination telephone number corresponding to the first person.

11. A method, as claimed in claim 10, wherein said processing step further comprises instructing a switch to route the incoming call to the second termination telephone number.

12. A method for facilitating communication between a calling party and a first person via a first termination telephone number that is no longer assigned to the first person, said method comprising the steps of:

receiving an incoming call from the calling party, wherein the incoming call is initiated by the calling party via at least a service code;

receiving a first input from the calling party, the first input corresponding to the first termination telephone number formerly associated with the first person;

processing at least the first termination telephone number to obtain information concerning communicating with the first person; and performing at least one of first, second and third steps based upon the information obtained in said processing step, wherein said first step comprises the step of routing the incoming call from the calling party to a second termination telephone number associated with the first person to enable the calling party to communicate with the first person, wherein said second step comprises the step of playing to the calling party an intercept message corresponding to the first person, the intercept message including information regarding the first person, and wherein said third step comprises the step of routing the incoming call from the calling party to a voice mail number, the voice mail number being associated with a voice mail box accessible by the first person, to enable the calling party to leave a message for the first person.

13. A method, as claimed in claim 12, wherein said steps of receiving the incoming call via at least the service code and the first input from the calling party are performed substantially consecutively.

14. A method, as claimed in claim 12, wherein the incoming call is initiated by the calling party via the service code before said step of receiving the first input from the calling party.

15. A method, as claimed in claim 12, wherein said receiving the incoming call via at least the service code step comprises the step of acknowledging the validity of the service code to activate a stored program control capable of generating a query for the information concerning communicating with the first person.

16. A method, as claimed in claim 12, wherein a switch is utilized to perform said steps of receiving the incoming call via the service code and the first input from the calling party, wherein said step of receiving the first input comprises the step of retrieving from a register in the switch the first termination telephone number.

17. A method, as claimed in claim 12, wherein said processing step comprises the step of:

generating a query for information concerning communicating with the first person, the query corresponding to at least the first termination telephone number.

18. A method, as claimed in claim 17, wherein a stored program control implemented in a switch is used to generate the query.

19. A method, as claimed in claim 12, wherein said processing step comprises the steps of:

searching for information corresponding to the first termination telephone number, the information being stored in a database; and generating an instruction corresponding to the information retrieved during said searching step, wherein the instruction corresponds to at least one of said first, second and third steps.

20. A method, as claimed in claim 19, wherein said searching step comprises the step of matching the first termination telephone number with data concerning the first person, wherein the data is stored in the database.

21. A method, as claimed in claim 19, wherein said processing step further comprises the step of:

directing, in accordance with the instruction from said generating the instruction step, a switch to perform at least one of said first, second and third steps.

22. A method, as claimed in claim 19, wherein a service control point is used to perform said searching step and said instructing step, the service control point being associated with the database containing the information.

23. A method, as claimed in claim 12, wherein the information obtained in said processing step comprises at least one of the second termination telephone number and an indication to route the incoming call to the second termination telephone number, wherein said performing step comprises performing said first step via a switch.

24. A method, as claimed in claim 12, wherein the information obtained in said processing step comprises at least one of an indication to play the intercept message and data corresponding to the first person, the data to be included in the intercept message, wherein said performing step comprises performing said second step.

25. A method, as claimed in claim 12, wherein said performing step comprises performing said second step, wherein said processing step comprises the step of invoking an intercept system via a switch to play to the calling party the intercept message corresponding to the first person.

26. A method, as claimed in claim 12, wherein the information obtained in said processing step includes one of the voice mail number and an indication to route the incoming call to the voice mail number, wherein said performing step comprises performing said third step via a switch.

27. A method, as claimed in claim 12, wherein said performing step comprises performing said third step, said method further comprising the step of:

recording a voice mail message from the calling party.

28. A method, as claimed in claim 12, wherein said performing step comprises performing said third step, said method further comprising the steps of:

storing the voice mail message from the calling party in one of a recorder and a database accessible by the first person; and playing the voice mail message from the calling party to the first person.

29. A system for facilitating communication between an calling party and a first person via a service code and a first termination telephone number that is no longer assigned to the first person, said system comprising:

means for receiving an incoming call initiated by the calling party via at least the service code;

means, associated with said receiving means, for processing at least one of the service code and the first termination telephone number to retrieve information concerning communicating with the first person from a database associated therewith; and means, associated with said processing means, for performing at least one of routing the incoming call to at least one of a second termination currently associated with the first person and a voice mail number associated with the first person and playing to the calling party an intercept message corresponding to the first person.

30. A system, as claimed in claim 29, wherein said means for receiving comprises a means for acknowledging the service code to activate a stored program control associated with said acknowledging means, said stored program control being capable of generating a query for information regarding communicating with the first person.

31. A system, as claimed in claim 30, wherein said means for acknowledging and said stored program control are implemented in a switch.

32. A system, as claimed in claim 30, wherein said acknowledging means is a public office dialing plan feature access code trigger.

33. A system, as claimed in claim 29, wherein said means for receiving the incoming call comprises a switch and a receiving means, associated with said switch, for collecting a first input from the calling party, wherein the first input corresponds to the first termination telephone number.

34. A system, as claimed in claim 33, wherein said receiving means for collecting the first input comprises a means for retrieving the first termination telephone number from a register in said switch.

35. A system, as claimed in claim 29, wherein said processing means comprises a service control point associated with said database containing information concerning communicating with the first person.

36. A system, as claimed in claim 29, wherein said information concerning communicating with the first person includes at least one of said second terminating telephone number associated with the first person, an indication to play said intercept message to the calling party and said voice mail number associated with the first person.

37. A system, as claimed in claim 29, wherein said means for performing routing of the incoming call via one of said second termination telephone number and said voice mail number comprises a switch.

38. A system, as claimed in claim 29, wherein said means for performing playing the intercept message to the calling party comprises an intercept system.

* * * * *

UNITED STATES PATENT AND TRADEMARK OFFICE
CERTIFICATE OF CORRECTION

PATENT NO. : 5,781,616
DATED      : July 14, 1998
INVENTOR(S): Edward A. Youngs, Monica A. Marics It is certified that error appears in the above-identified patent and that said Letters Patent is hereby corrected as shown below:

On the title page: Item [73] Assignee: add "U S WEST , INC., Englewood, Colorado--.

Signed and Sealed this

Second Day of February, 1999

Attest:

Attesting Officer

Acting Commissioner of Patents and Trademarks